(12) United States Patent
Ott

(10) Patent No.: US 12,164,153 B2
(45) Date of Patent: Dec. 10, 2024

(54) FIBER OPTIC ADAPTER WITH INTEGRALLY MOLDED STRUCTURES

(71) Applicant: COMMSCOPE TECHNOLOGIES LLC, Hickory, NC (US)

(72) Inventor: Michael James Ott, Hudson, WI (US)

(73) Assignee: Commscope Technologies LLC, Hickory, NC (US)

(*) Notice: Subject to any disclaimer, the term of this patent is extended or adjusted under 35 U.S.C. 154(b) by 360 days.

(21) Appl. No.: 17/422,061

(22) PCT Filed: Jan. 8, 2020

(86) PCT No.: PCT/US2020/012739
§ 371 (c)(1),
(2) Date: Jul. 9, 2021

(87) PCT Pub. No.: WO2020/146500
PCT Pub. Date: Jul. 16, 2020

(65) Prior Publication Data
US 2022/0099899 A1   Mar. 31, 2022

Related U.S. Application Data

(60) Provisional application No. 62/790,239, filed on Jan. 9, 2019.

(51) Int. Cl.
*G02B 6/38* (2006.01)
(52) U.S. Cl.
CPC ......... *G02B 6/3825* (2013.01); *G02B 6/3874* (2013.01)
(58) Field of Classification Search
CPC ....... G02B 6/38; G02B 6/3825; G02B 6/3874
See application file for complete search history.

(56) References Cited

U.S. PATENT DOCUMENTS

| 5,073,042 A | 12/1991 | Mulholland et al. |
| 5,082,344 A | 1/1992 | Mulholland et al. |

(Continued)

FOREIGN PATENT DOCUMENTS

| EP | 0 731 369 A2 | 9/1996 |
| EP | 1 099 967 A2 | 5/2001 |

OTHER PUBLICATIONS

International Search Report and Written Opinion of the International Searching Authority for International Patent Application No. PCT/US2020/012739 mailed May 26, 2020, 14 pages.

*Primary Examiner* — Tina M Wong
(74) *Attorney, Agent, or Firm* — Merchant & Gould P.C.

(57) ABSTRACT

The present disclosure relates to a fiber optic adapter for interconnecting first and second optical fiber connectors in coaxial alignment along an optical axis. The fiber optic adapter includes a housing with a first end and an opposite, a second end. The housing includes first and second adapter halves that each include an axial cavity defined by a top side-wall, a bottom side-wall, a right side-wall, and a left side-wall. The fiber optic adapter includes a first ferrule alignment structure located within the axial cavity of the first adapter half of the housing and a second ferrule alignment structure located within the axial cavity of the second adapter half of the housing. The fiber optic adapter includes double cantilever wings respectively positioned on the right and left side-walls of each one of the first and second adapter halves of the housing. The double cantilever wings are slotted to provide dual arm clips configured to elastically deform for attachment into an aperture defined by a bulkhead structure.

24 Claims, 12 Drawing Sheets

(56) References Cited

U.S. PATENT DOCUMENTS

| | | |
|---|---|---|
| 5,233,674 A | 8/1993 | Vladic |
| 5,274,729 A | 12/1993 | King et al. |
| 5,317,663 A | 5/1994 | Beard et al. |
| 5,333,222 A | 7/1994 | Belenkiy et al. |
| 5,348,487 A | 9/1994 | Marazzi et al. |
| 5,359,688 A | 10/1994 | Underwood |
| 5,408,557 A | 4/1995 | Hsu |
| 5,542,015 A | 7/1996 | Hultermans |
| 5,647,043 A | 7/1997 | Anderson et al. |
| 5,737,464 A | 4/1998 | Underwood et al. |
| 5,774,612 A | 6/1998 | Belenkiy et al. |
| 5,838,855 A | 11/1998 | Stephenson |
| 6,027,252 A | 2/2000 | Erdman et al. |
| 6,164,835 A | 12/2000 | Imasaki |
| 6,347,888 B1 | 2/2002 | Puetz |
| 6,367,984 B1 | 4/2002 | Stephenson et al. |
| 6,688,780 B2 | 2/2004 | Duran |
| 6,712,523 B2 | 3/2004 | Zimmel |
| 6,872,008 B2 | 3/2005 | Takeda et al. |
| 7,182,524 B2 | 2/2007 | Kramer et al. |
| 7,377,697 B2 | 5/2008 | Kahle et al. |
| 7,380,992 B2 | 6/2008 | Kramer et al. |
| 7,583,883 B2 | 9/2009 | Kowalczyk et al. |
| 7,703,987 B2 | 4/2010 | Kramer et al. |
| 7,862,243 B2 | 1/2011 | Kahle et al. |
| 7,945,137 B2 | 5/2011 | Kowalczyk et al. |
| 8,068,711 B2 | 11/2011 | Sielaff |
| 8,123,415 B2 | 2/2012 | Kahle et al. |
| 8,224,144 B2 | 7/2012 | Allen |
| 8,313,248 B2 | 11/2012 | Kahle et al. |
| 8,382,382 B2 | 2/2013 | Nelson |
| 8,391,664 B2 | 3/2013 | Kowalczyk et al. |
| 8,636,422 B2 | 1/2014 | Kahle et al. |
| 8,845,205 B2 | 9/2014 | Nelson |
| 8,882,364 B2 | 11/2014 | Busse et al. |
| 8,985,861 B2 | 3/2015 | Kahle et al. |
| 8,992,095 B2 | 3/2015 | Nelson |
| 9,310,570 B2 | 4/2016 | Busse et al. |
| 9,354,402 B2 | 5/2016 | Nelson |
| 9,377,590 B2 | 6/2016 | Kahle et al. |
| 9,733,434 B2 | 8/2017 | Kahle et al. |
| 9,739,951 B2 | 8/2017 | Busse et al. |
| 9,778,422 B2 | 10/2017 | Nelson |
| 10,185,095 B2 | 1/2019 | Kahle et al. |
| 10,197,741 B2 | 2/2019 | Nelson |
| 10,795,090 B2 | 10/2020 | Nelson |
| 10,948,661 B2 | 3/2021 | Kahle et al. |
| 2007/0165984 A1 | 7/2007 | Nakagawa |
| 2007/0201798 A1 | 8/2007 | Kramer et al. |
| 2008/0267566 A1* | 10/2008 | En Lin ............... G02B 6/3849 385/53 |
| 2013/0177279 A1* | 7/2013 | Nelson ............... G02B 6/3869 156/245 |
| 2016/0033723 A1 | 2/2016 | Liu |
| 2021/0109295 A1 | 4/2021 | Nelson |

\* cited by examiner

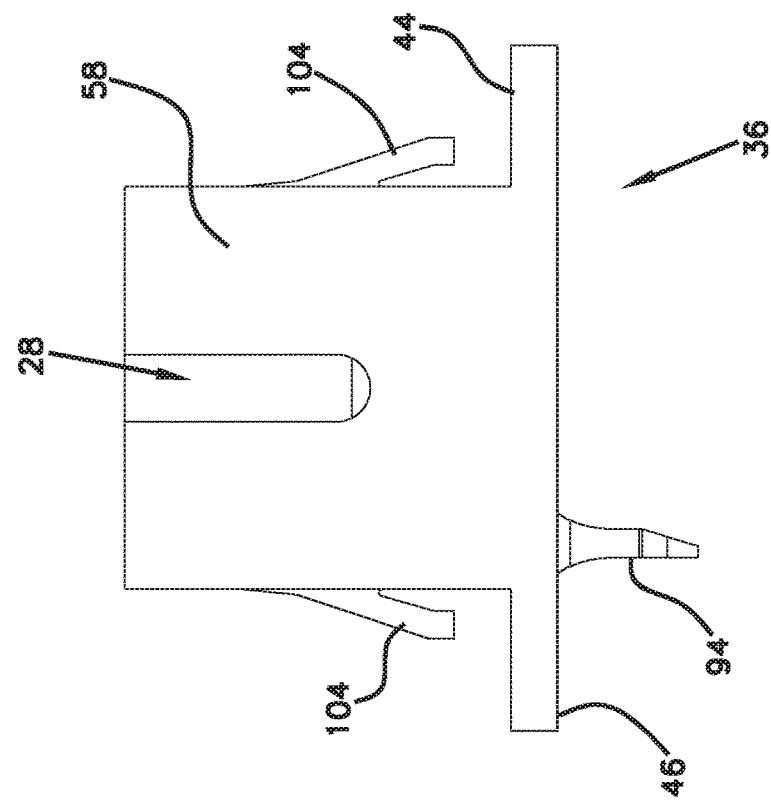
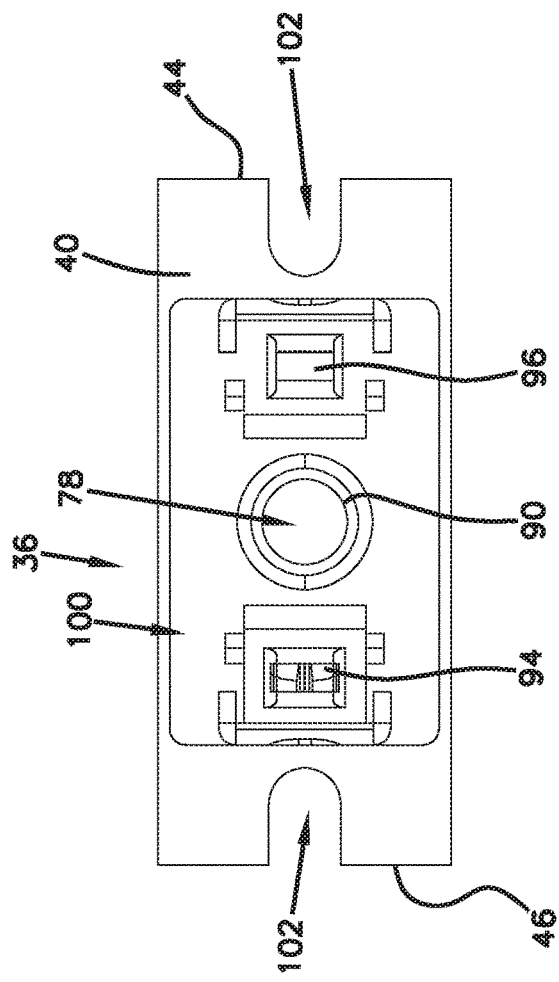
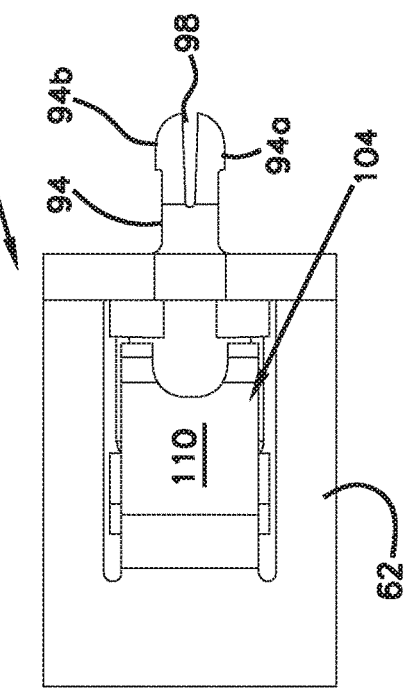

FIBER OPTIC ADAPTER WITH INTEGRALLY MOLDED STRUCTURES

CROSS-REFERENCE TO RELATED APPLICATION

This application is a National Stage Application of PCT/US2020/012739, filed on Jan. 8, 2020, which claims the benefit of U.S. Patent Application Ser. No. 62/790,239, filed on Jan. 9, 2019, the disclosures of which are incorporated herein by reference in their entireties. To the extent appropriate, a claim of priority is made to each of the above disclosed applications.

TECHNICAL FIELD

The present disclosure relates generally to fiber optic adapters. In particular, the present disclosure relates to fiber optic adapters including two adapter halves with ferrule alignment features and cantilevered retaining clips.

BACKGROUND

Fiber optics have revolutionized communication throughout the world. Fiber optics are generally thin strings of glass designed to carry light which can be grouped together. With the increased use of fiber optics, it has become increasingly important to be able to connect and disconnect fiber optic cables from various sources. Two fiber optic cables can be optically coupled so that they are in communication with one another by using well-known connectors and adapters, thereby putting each fiber optic cable in communication with the other. The connectors are terminated to the end of each cable and then plugged into the adapters. The adapters normally include an opening at each end designed to receive the connectors. An example adapter for holding two SC-type mating connectors is described in U.S. Pat. No. 5,317,663. Improvements in the design and manufacture of fiber optic adapters are desirable.

SUMMARY

The present disclosure relates generally to fiber optic adapters including two adapter halves configured to receive fiber optic connectors having ferrules. The two adapter halves each include one or more structures.

In a preferred embodiment, the structures are integrally molded as a unitary piece within the two adapter halves.

One aspect of the present disclosure relates to a fiber optic adapter for interconnecting first and second optical fiber connectors in coaxial alignment along an optical axis. Each one of the first and second optical fiber connectors include a generally cylindrical ferrule that holds an end of an optical fiber. The fiber optic adapter can include a housing having a first end and an opposite, a second end. The first end can define a first open receptacle for receiving the first optical fiber connector and the second end can define a second open receptacle for receiving the second optical fiber connector. The housing includes first and second adapter halves each having an axial cavity defined by a top side-wall, a bottom side-wall, a right side-wall, and a left side-wall. The axial cavity of the first and second adapter halves each have an axial length. The fiber optic adapter can further include a first ferrule alignment structure located within the axial cavity of the first adapter half of the housing and a second ferrule alignment structure located within the axial cavity of the second adapter half of the housing. The fiber optic adapter can include double cantilever wings respectively positioned on the right and left side-walls of each one of the first and second adapter halves of the housing. The double cantilever wings can be slotted to provide dual arm clips configured to elastically deform for attachment into an aperture defined by a bulkhead structure. The dual arm clips can be configured to latch into apertures that are narrow and wide in size.

Another aspect of the present disclosure relates to a fiber optic adapter for interconnecting first and second optical fiber connectors in coaxial alignment along an optical axis. Each one of the first and second optical fiber connectors include a generally cylindrical ferrule that holds an end of an optical fiber. The fiber optic adapter includes a housing with an axial cavity defined by a top side-wall, a bottom side-wall, a right side-wall, and a left side-wall. The axial cavity of the housing has an axial length and a midpoint. The fiber optic adapter further includes ferrule alignment structures located within the axial cavity of the housing. The fiber optic adapter can include cantilever wings respectively positioned on the right and left side-walls of the housing. The cantilever wings can be slotted to provide dual arm clips configured to elastically deform for attachment into an aperture defined by a bulkhead structure.

A further aspect of the present disclosure relates to an adapter assembly for interconnecting a pair of opposing optical fiber connectors generally along an optical axis. The adapter assembly can be constructed as a two open-ended receptacle for receiving the optical fiber connectors in opposite open ends thereof. The adapter assembly can include an adapter housing having a pair of adapter halves each defining one of the open ends for receiving one of the optical fiber connectors. The adapter assembly can further include at least one latch member on one of the pair of adapter halves that projects parallel to the optical axis toward the other one of the pair of adapter halves. The at least one latch member can be engageable with an opening defined in the other one of the pair of adapter halves. The adapter assembly can include cantilever wings respectively positioned on opposite sides of the adapter housing. The cantilever wings can be slotted to provide dual arm clips configured to elastically deform for attachment into an aperture defined by a panel for mounting the adapter housing in the aperture of the panel.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 10 is an end view of the adapter half shown in FIG. 8.

FIG. 11 is a side perspective view of the adapter half shown in FIG. 8.

FIG. 12 is a top plan view of the adapter half shown in FIG. 8.

DETAILED DESCRIPTION

Reference will now be made in detail to examples of inventive aspects of the present disclosure which are illustrated in the accompanying drawings. Wherever possible, the same reference numbers will be used throughout the drawings to refer to the same or like parts.

Figure 1:
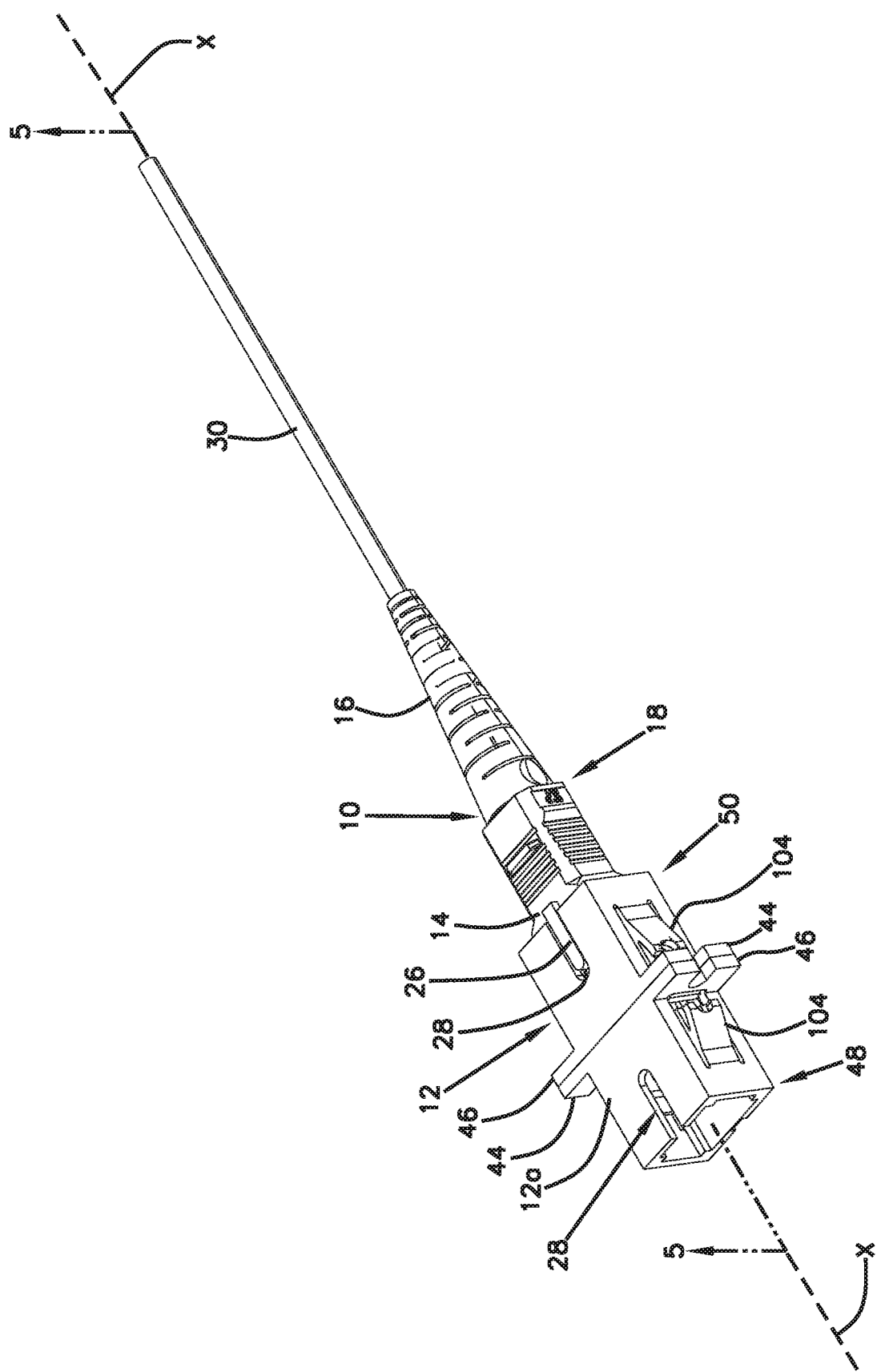
FIG. 1 is a perspective view of an optical fiber connector and a fiber optic adapter with the optical fiber connector inserted into the fiber optic adapter.
Figure 2:
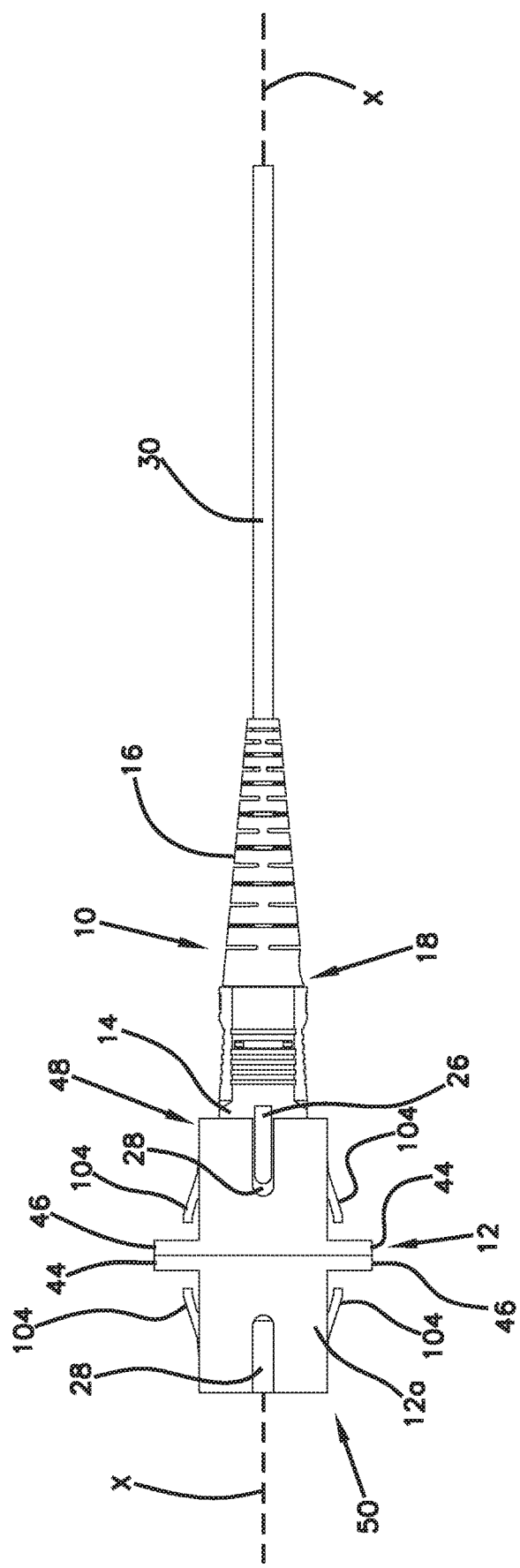
FIG. 2 is a top plan view of the fiber optic adapter and the optical fiber connector shown in FIG. 1.
Figure 3:
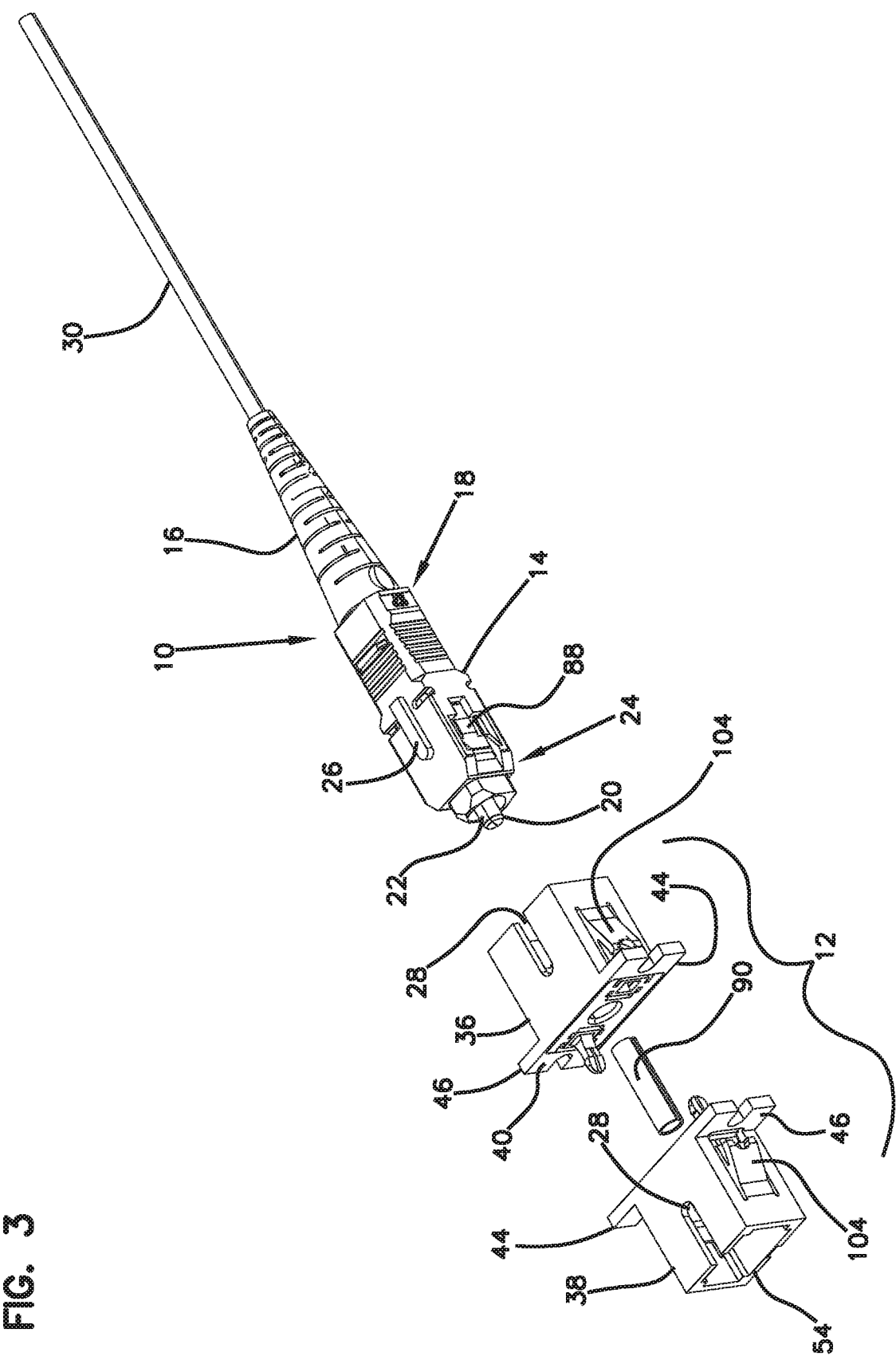
FIG. 3 is an exploded view of the fiber optic adapter shown in FIG. 1 with two adapter halves and the optical fiber connector removed.
Figure 4:
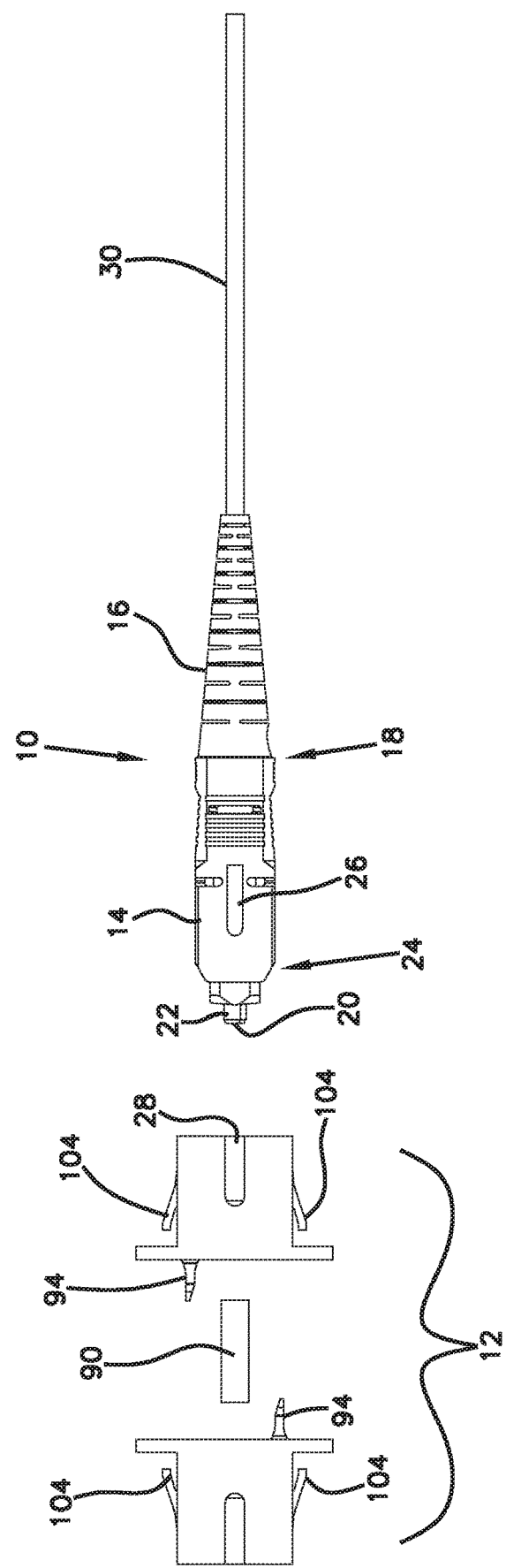
FIG. 4 is a top plan view of the fiber optic adapter and the optical fiber connector shown in FIG. 3.
Figure 5:
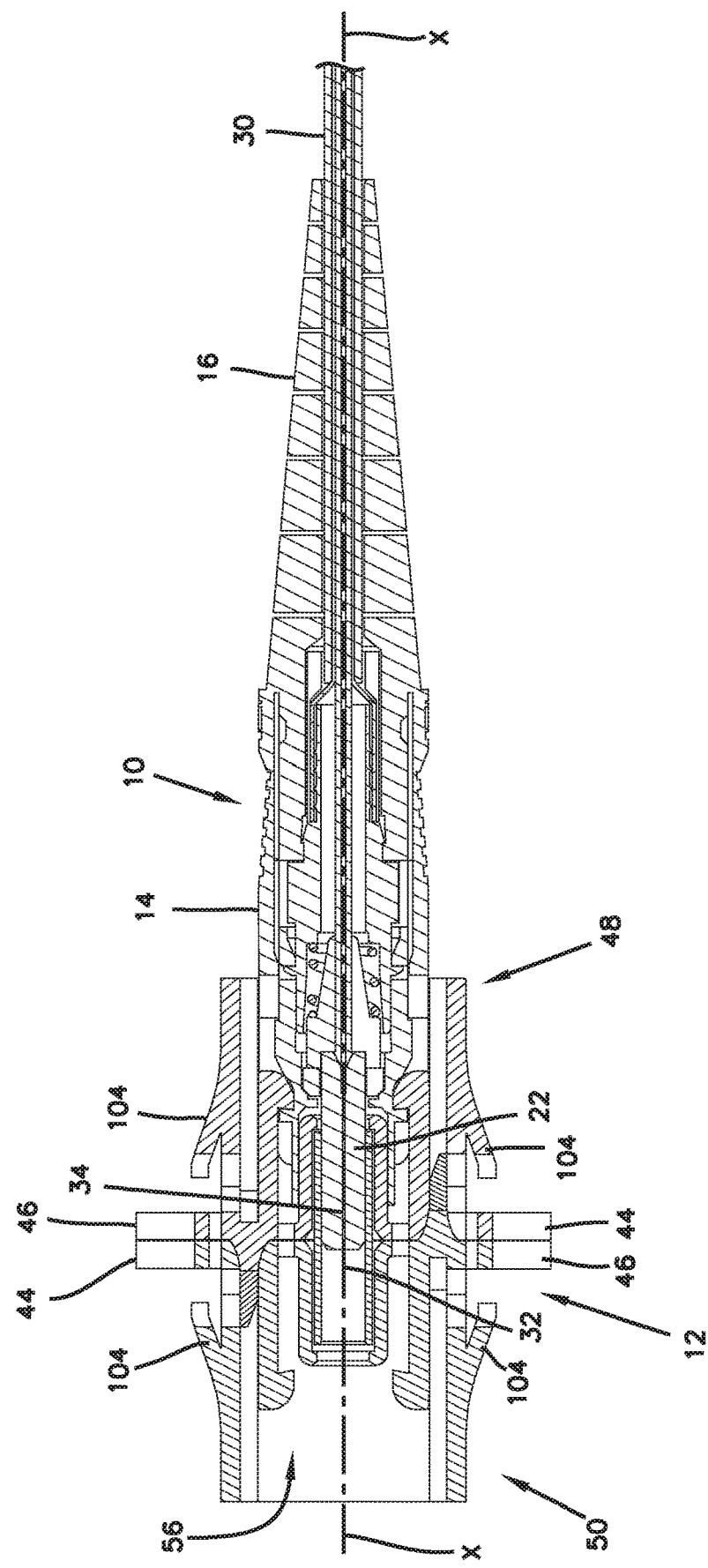
FIG. 5 is a top cross-sectional view taken along section line 5-5 of FIG. 1.
Figure 6:
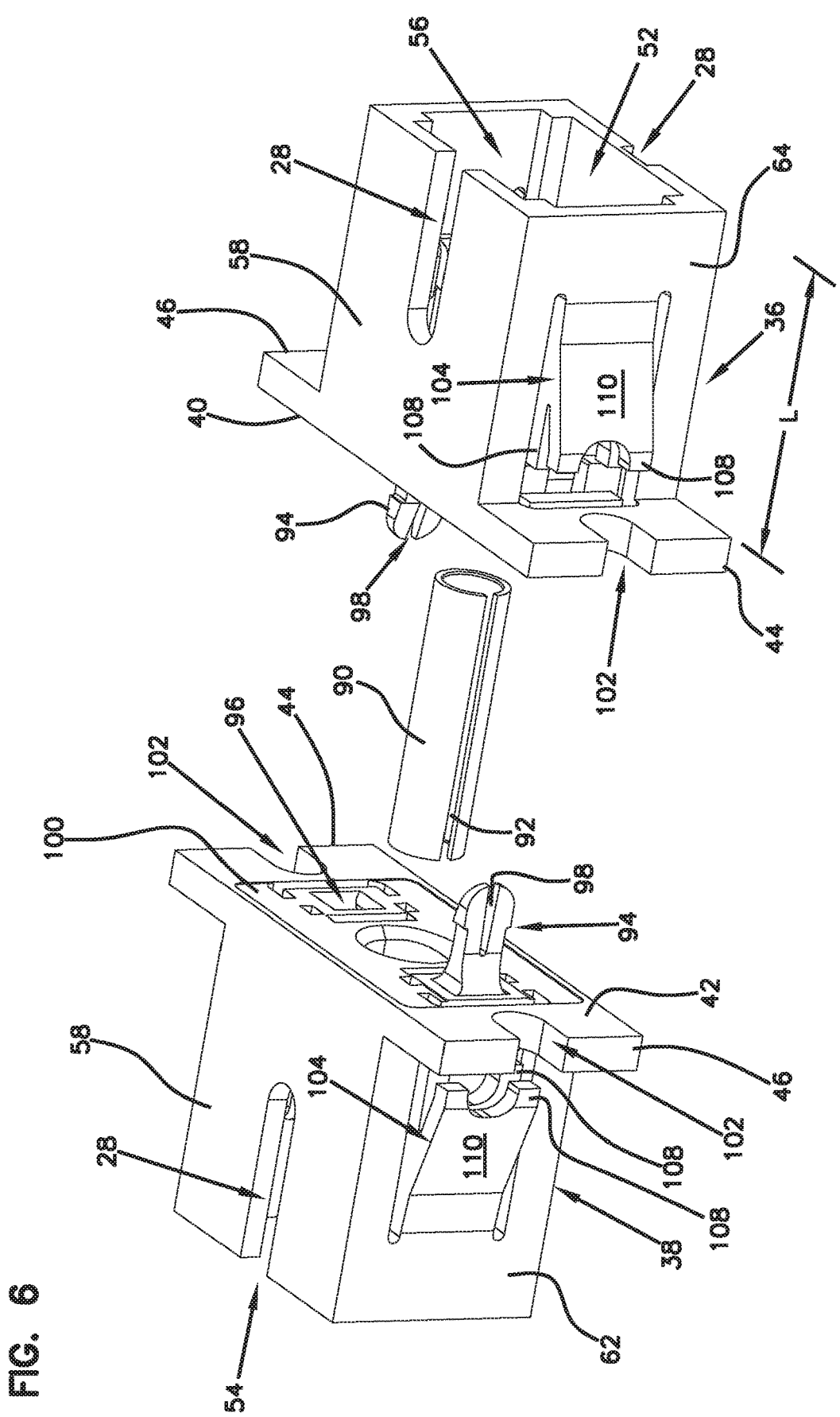
FIG. 6 is an enlarged view of the fiber optic adapter shown in FIG. 3.

Referring to FIGS. 1-2, an optical fiber connector 10 is shown inserted into a fiber optic adapter 12. In the example depicted, the optical fiber connector 10 is a SC-type connector. However, it should be noted that the SC-type fiber optic adapter 12 described herein represents only one example embodiment of the features of the present disclosure and that the features may be applicable to adapters configured to be used with other types of connectors (e.g., LC, LX, MPO, MPX, etc.). The optical fiber connector 10 includes a housing 14 and a strain relief boot 16 mounted at a rear end 18 of the optical fiber connector 10. A front portion 20 (see FIGS. 3-4) of a ferrule 22 (see FIGS. 3-4) is shown extending out a front end 24 (see FIG. 3) of the optical fiber connector 10. The external surface of the housing 14 includes a longitudinal key 26 (e.g., keying feature) that is sized to be received into a slot 28 (e.g., a keying feature) of the fiber optic adapter 12. The fiber optic adapter 12 can be configured for interconnecting two optical fiber connectors in coaxial alignment along an optical axis X. The optical fiber connectors can each include a generally cylindrical ferrule 22 that holds an end of a bare optical fiber 32. As used herein, the term, "bare optical fiber" and variants thereof, in this context, means an optical fiber with a core, a cladding layer surrounding he core, and no coating over the cladding layer.

FIGS. 1-5 show the optical fiber connector 10 mounted to a fiber optic cable 30. The fiber optic cable 30 has the bare optical fiber 32 that is attached to the optical fiber connector 10 using conventional techniques well known in the art. This includes stripping the end of the fiber optic cable 30 to expose the optical fiber 32. The optical fiber 32 is then fed into the optical fiber connector 10 all the way through a passage 34 (see FIG. 5) in the ferrule 22. The optical fiber 32 may be either mechanically or adhesively retained within the ferrule 22.

Turning to FIGS. 6-13, the fiber optic adapter 12 can include a housing 12a that may be formed by two adapter halves 36, 38 (e.g., a first adapter half, a second adapter half, a pair of adapter halves) that can be joined at respective first and second end faces 40, 42 and respective flanges 44, 46. The flanges 44, 46 are generally rectangular in shape. The two adapter halves 36, 38 can be constructed of plastic by an injection molding process. It is contemplated that other materials and other molding processes may be used for the construction of the fiber optic adapter 12.

The housing 12a can include a first end 48 and an opposite, second end 50. The first end 48 of the housing 12a defines a first open receptacle 52 for receiving the optical fiber connector 10 (e.g., first optical fiber connector). The second end 50 of the housing 12a defines a second open receptacle 54 for receiving another optical fiber connector (e.g., second optical fiber connector)(not shown). The two adapter halves 36, 38 can each include an axial cavity 56 defined by a top side-wall 58, a bottom side-wall 60 (see FIG. 9), a right side-wall 62 (see FIG. 9), and a left side-wall 64. The flanges 44, 46 of the two adapter halves 36, 38 outwardly protrude from each of the respective right side-wall 62 and left side-wall 64 of the housing 12a. The axial cavity 56 of the two adapter halves 36, 38 can each have an axial length L. The top side-wall 58 of the housing 12a defines the slot 28 at each of the first and second ends 48, 50 of the housing 12a configured to intermate with the longitudinal key 26 of the optical fiber connector 10 and another optical fiber connector to orient the optical fiber connector 10 and the other optical fiber connector in the correct orientation.

The two adapter halves 36, 38 are of substantially identical construction and function, except for their 180 opposite orientation in assembly. Therefore, the features described with reference to the first adapter half 36 would also apply to the second adapter half 38.

Figure 7:
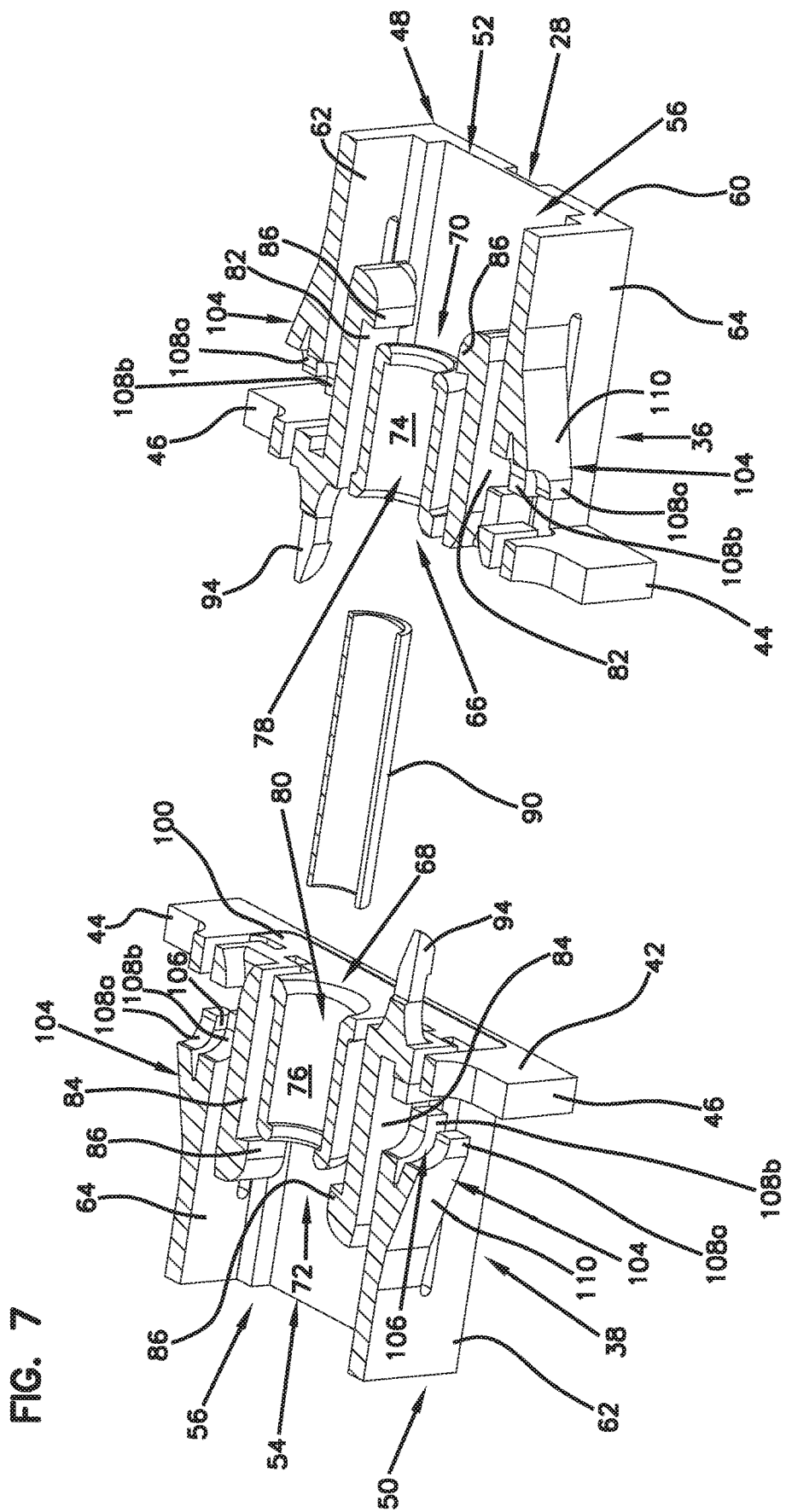
FIG. 7 is a cross-sectional view of the fiber optic adapter shown in FIG. 6.
Figure 7A:
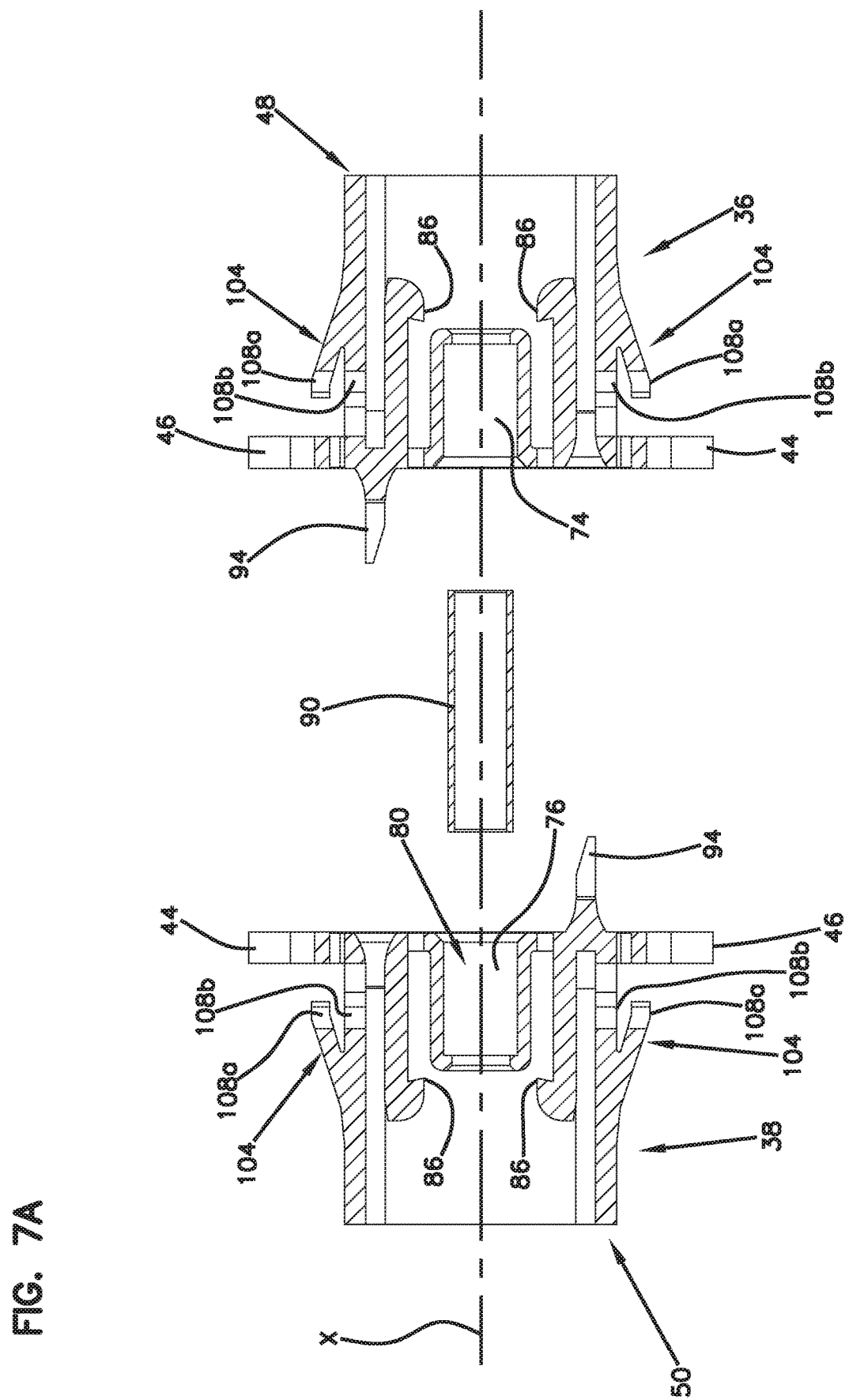
FIG. 7A is a top cross-sectional view of the fiber optic adapter shown in FIG. 7.
Figure 8:
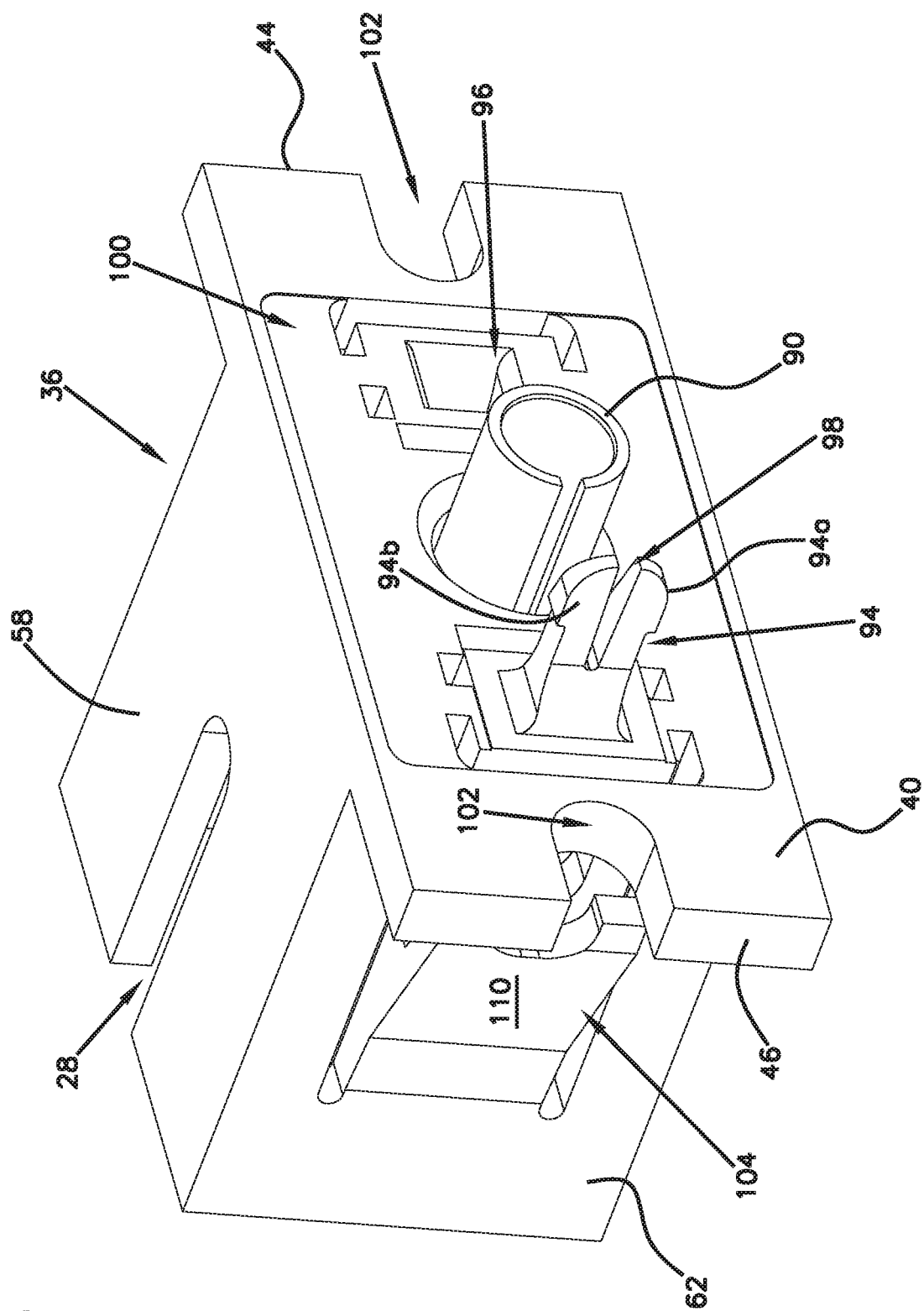
FIG. 8 is a perspective view of a mating end of one of the adapter halves shown in FIG. 6 with a split sleeve mounted therein.
Figure 9:
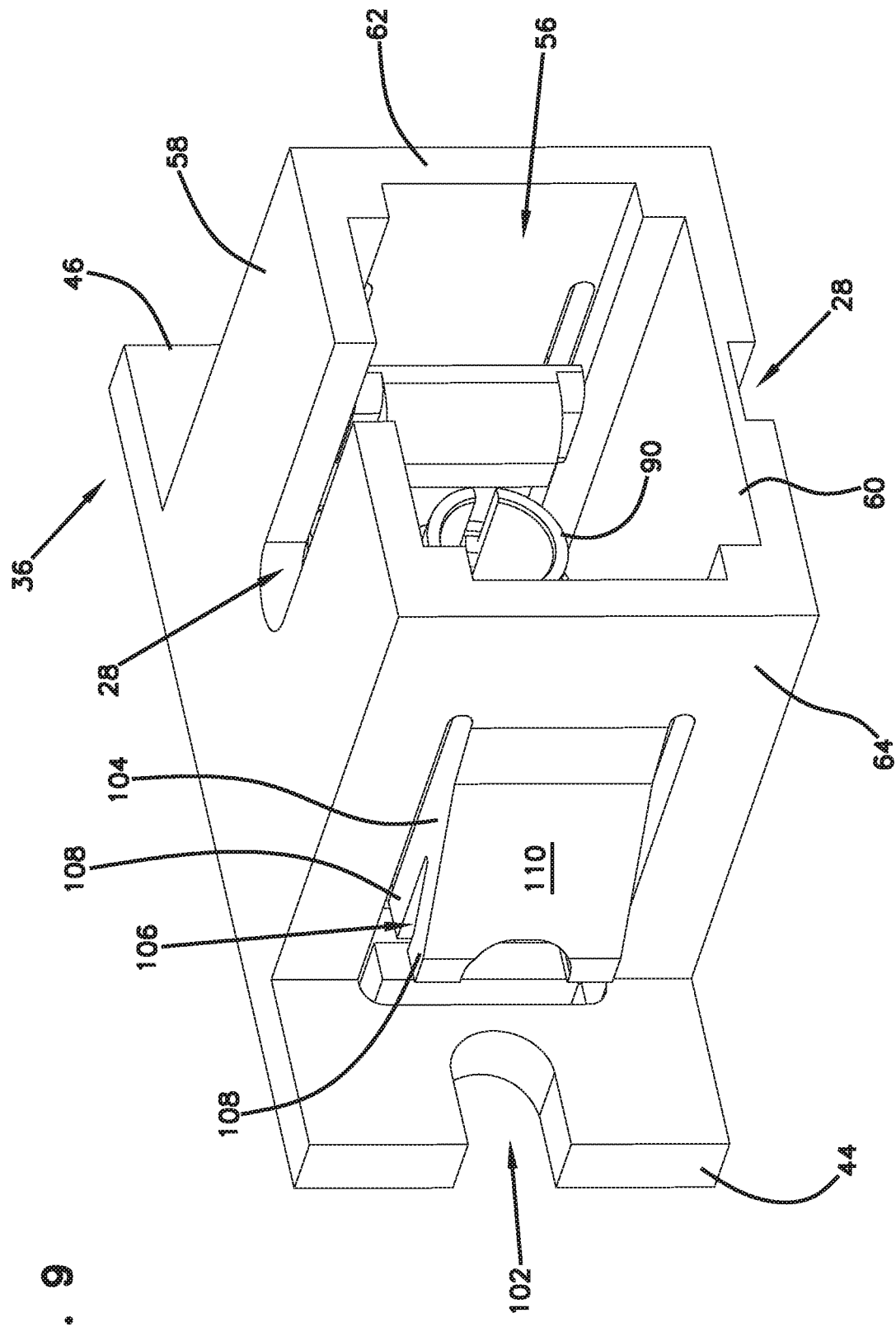
FIG. 9 is a perspective view of an opposite end of the adapter half shown in FIG. 8.

Turning again to FIG. 7 and FIG. 7A, a first ferrule alignment structure 66 cam be located within the axial cavity 56 of the first adapter half 36 of the housing 12a and a second ferrule alignment structure 68 can be located within the axial cavity 56 of the second adapter half 38 of the housing 12a.

In a preferred example, the first and second ferrule alignment structures 66, 68 can be unitarily molded as a single piece with their respective first and second adapter halves 36, 38 of the housing 12a, although alternatives are possible. That is, the first and second ferrule alignment structures 66, 68 may be separate parts that can be inserted within respective first and second adapter halves 36, 38. The separate first and second ferrule alignment structures 66, 68 may be made from a plastic or polymeric material or a metallic material, although alternatives are possible.

The first and second ferrule alignment structures 66, 68 can be configured to receive and coaxially align the ferrule 22 of the optical fiber connector 10 with another ferrule of another optical fiber connector when both optical fiber connectors are inserted into the fiber optic adapter 12. In certain examples, the first and second ferrule alignment structures 66, 68 can be injection-molded from a polymer. That is, in a preferred example, the first and second ferrule alignment structures 66, 68 can be integrally made with the first and second adapter halves 36, 38, respectively. It will be appreciated that the first and second ferrule alignment structures 66, 68 may be separately made pieces from the first and second adapter halves 36, 38.

The first and second ferrule alignment structures 66, 68 respectively include first and second sleeve mounts 70, 72 and first and second ferrule sleeves 74, 76 adapted to be respectively positioned within the first and second sleeve mounts 70, 72. The first sleeve mount 70 of the first ferrule alignment structure 66 can include a first axial bore 78 and the second sleeve mount 72 of the second ferrule alignment structure 68 can include a second axial bore 80. When the first and second adapter halves 36, 38 are connected together, the first and second axial bores 78, 80 are coaxial in the housing 12a and define a common cylinder. It is in the common cylinder defined by the first and second adapter halves 36, 38 where ferrules 22 of different fiber optic cables 30 meet and are in optical communication.

In certain examples, the first sleeve mount 70 of the first ferrule alignment structure 66 can include at least one latching hook 82 that extends from the first end face 40 of the first adapter half 36 toward the first end 48 of the housing 12a, and the second sleeve mount 72 of the second ferrule alignment structure 68 can include at least one latching hook 84 that extends from a second end face 42 of the second adapter half 38 toward the second end 50 of the housing 12a. In certain examples, the at least one latching hooks 82, 84 can be configured to respectively flex laterally toward and away from the first and second axial bores 78, 80 for releasably latching the optical fiber connector 10 and another optical fiber connector to the fiber optic adapter 12, respectively.

In certain examples, the first sleeve mount 70 can include two latching hooks 82 that extend from the first end face 40 of the first adapter half 36 toward the first end 48 of the housing 12a and the second sleeve mount 72 can include two latching hooks 84 that extend from the second end face 42 of the second adapter half 38 toward the second end 50 of the housing 12a. The two latching hooks 82 of the first sleeve mount 70 extending toward the first end 48 of the housing 12a can be positioned on opposite sides of the first axial bore 78 and are configured to flex toward and away from each other to releasably latch the optical fiber connector 10 to the fiber optic adapter 12.

The two latching hooks 84 of the second sleeve mount 72 extending toward the second end 50 of the housing 12a are positioned on opposite sides of the second axial bore 80 and are configured to flex toward and away from each other to releasably latch a second optical fiber connector (not shown) to the fiber optic adapter 12. The two latching hooks 82, 84 of the first and second sleeve mounts 70, 72 each include inwardly extending portions 86 respectively configured to engage slots 88 (see FIG. 3) defined on the housing 14 of the optical fiber connector 10 and a housing of another optical fiber connector when the connectors are mounted within the fiber optic adapter 12. The fiber optic adapter 12 may include a split sleeve 90 that defines a longitudinal split or slot 92 that runs an entire length of the split sleeve 90. In certain examples, the split sleeve 90 might not include such a longitudinal split or include a split of a different design, and still conform to the present disclosure.

The split sleeve 90 is generally cylindrical in shape. In certain examples, the split sleeve 90 can be molded from plastic material and separate from the housing 12a. In a preferred example, the split sleeve 90 may be made integral with the housing 12a, although alternatives are possible. In certain examples, the split sleeve 90 can be generally constructed of a metal material, such as, but not limited to, copper, and its dimensions are well known in the art.

Figure 13:
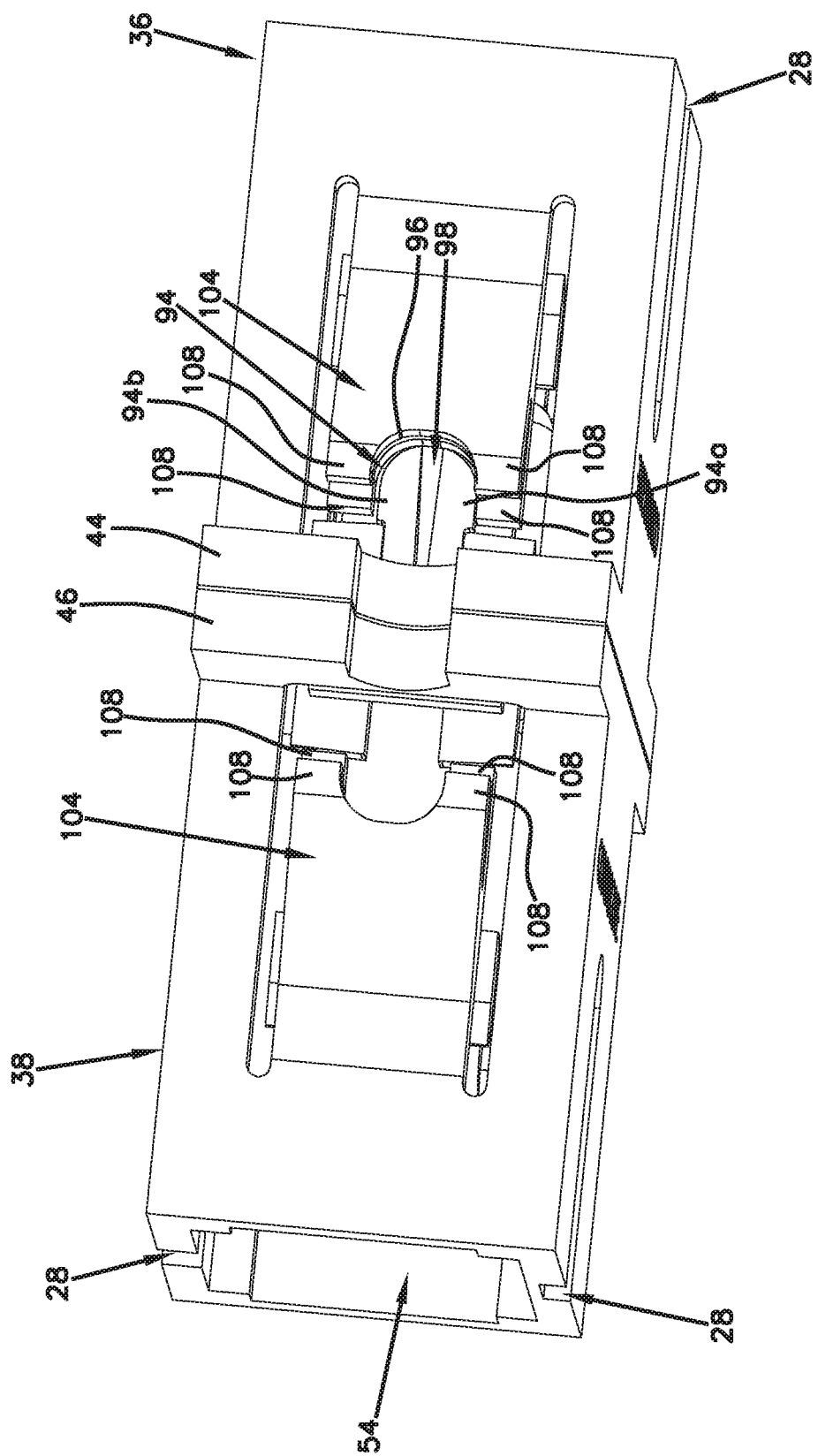
FIG. 13 is a perspective side view of the fiber optic adapter shown in FIG. 1 with the optical fiber connector removed.

Turning again to FIGS. 8-10, the fiber optic adapter 12 may include at least one latch member 94 on one of the pair of adapter halves 36, 38 that projects parallel to the optical axis X toward the other one of the pair of adapter halves 36, 38. The pair of adapter halves 36, 38 can each include at least one latch member 94 that can be engageable with an opening 96 (e.g., cavity) defined in the other one of the pair of adapter halves 36, 38 to mate the two adapter halves 36, 38 together as depicted in FIG. 13.

In certain examples, when the pair of adapter halves 36, 38 are joined, a part line between the pair of adapter halves 36, 38 can be ultrasonically welded or glued so that the pair of adapter halves 36, 38 can form an inseparable and solid fiber optic adapter.

In certain examples, the at least one latch member 94 may include a flex slot 98 to provide to flexible arms 94a, 94b, although alternatives are possible. In some examples, the at least one latch member 94 may not be configured with a flex slot to increase latch strength. The first and second end faces 40, 42 of the first and second adapter halves 36, 38 may be configured with an undercut 100 (e.g., recess) to help assist with connecting the two adapter halves 36, 38 together. That is, the undercut 100 may help to overcome flatness issues when the two adapter halves 36, 38 are molded which can help assists with latching the two halves 36, 38 together.

The first and second adapter halves 36, 38 can be interconnected via a snap-fit connection or a press fit connection, although alternatives are possible. In certain examples, the two halves 36, 38 can be interconnected via an integral, flexible, living hinge, although alternatives are possible.

The flanges 44, 46 of the two adapter halves 36, 38 can each define a cutout 102 (e.g., slot, opening) for mounting or capturing the two adapter halves 36, 38 to or against a structure (e.g., dividing wall, telecommunications equipment, panel, etc.).

The first and second adapter halves 36, 38 each include integrally molded double cantilever wings 104 (e.g., retaining clip, cantilever wings) respectively positioned on the right and left side-walls 62, 64 of each one of the housings 12a. The double cantilever wings 104 can be configured with a slot 106 such that the double cantilever wings 104 are slotted into dual arm clips 108 that elastically deform for attachment into an aperture defined by a bulkhead structure without the use of any extraneous mounting clips or other hardware. The dual arm clips 108 can be configured to latch into apertures that are narrow and wide in size. For example, the fiber optic adapter 12 can be used with panel apertures in the range of about 0 to about 2 millimeters wider than an outer width dimension of the housing or body of the fiber optic adapter 12, although alternatives are possible.

In certain examples, the fiber optic adapter 12 can be used with panel apertures in the range of about 0 to about 3 millimeters wider than an outer width dimension of the housing or body of the fiber optic adapter 12, although alternatives are possible.

In certain examples, the fiber optic adapter 12 can be used with panel apertures in the range of about 0 to about 1 millimeters wider than an outer width dimension of the housing or body of the fiber optic adapter 12, although alternatives are possible.

In certain examples, the fiber optic adapter 12 can be used with panel apertures in the range of about 1 to about 2 millimeters wider than an outer width dimension of the housing or body of the fiber optic adapter 12, although alternatives are possible.

In certain examples, the double cantilever wings 104 can include ramped surfaces 110 to facilitate insertion of the fiber optic adapter 12 into an aperture defined by a bulkhead structure. The ramped surfaces 110 cause the double cantilever wings 104 to flex inwardly as the fiber optic adapter 12 is moved passed an aperture of a bulkhead structure or panel.

The double cantilever wings 104 can provide more width coverage while still completely collapsing inside of the housing 12a during panel installation. The double cantilever wings 104 allow for simultaneous flexing of the outer arm clip 108a and the inner arm clip 108b for insertion into a bulkhead opening. If the bulkhead opening is relatively small, the outer arm clip 108a can flex inward additionally into slot 106 without requiring that the inner arm clip 108b also flex inwardly an additional amount. If additional flexing of the inner arm clip 108b were always required, the inner arm clip 108b may interfere with other structures like the two latching hooks 82, 84.

The double cantilever wings 104 can be molded from a molded plastic or polymeric material. That is, the double cantilever wings 104 can be injection-molded from a polymer. In certain examples, the double cantilever wings 104 can be made integral with (e.g., formed in one seamless piece with) the first and second adapter halves 36, 38 of the housing 12a. The dual arm clips 108 can be configured to latch into apertures that are both narrow and wide in size.

When a first optical fiber connector 10 is fully inserted into the fiber optic adapter 12, the flexible latching hooks 82 of the sleeve mount 70 of the first adapter half 36 engage the slots 88 in the connector housing 14 to releasably hold the optical fiber connector 10 within the axial cavity 56 of the first adapter half 36. When a second optical fiber connector (not shown) is inserted into the opposing side of the fiber optic adapter 12, an optical connection is formed between the optical fiber 32 of the first optical fiber connector 10 and an optical fiber of the second optical fiber connector through the abutting contact faces of the ferrules 22 within the ferrule sleeve 74.

As discussed previously, the illustrated embodiment shows an SC-type fiber optic adapter 12 for receiving SC-type fiber optic connectors 10. It is anticipated that the inventive features of the present disclosure can be utilized with other types, sizes and designs of adapters and connectors.

The various examples described above are provided by way of illustration only and should not be construed to limit the scope of the present disclosure. Those skilled in the art will readily recognize various modifications and changes that may be made with respect to the examples and applications illustrated and described herein without departing from the true spirit and scope of the present disclosure.

What is claimed is:

1. A fiber optic adapter for interconnecting first and second optical fiber connectors in coaxial alignment along an optical axis, each one of the first and second optical fiber connectors including a generally cylindrical ferrule holding an end of an optical fiber, the fiber optic adapter comprising:
a housing including a first end opposite a second end, the first end defining a first open receptacle for receiving the first optical fiber connector, the second end defining a second open receptacle for receiving the second optical fiber connector, the housing including first and second adapter halves each including an axial cavity defined by a top side-wall, a bottom side-wall, a right side-wall, and a left side-wall, the axial cavity of the first and second adapter halves each having an axial length;
a first ferrule alignment structure located within the axial cavity of the first adapter half of the housing, and a second ferrule alignment structure located within the axial cavity of the second adapter half of the housing;
a first double cantilever wing positioned on the right side-wall of each one of the first and second adapter halves of the housing, each one of the first double cantilever wings comprising a dual arm clip, each one of the dual arm clips comprising a first arm and a second arm, the first arm being stacked on top of the second arm and separated from the second arm by a slot, the second arm being positioned between the first arm and the optical axis; and
a second double cantilever wing positioned on the left side-wall of each one of the first and second adapter halves of the housing, each one of the second double cantilever wings comprising a dual arm clip, each one of the dual arm clips comprising a first arm and a second arm, the first arm being stacked on top of the second arm and separated from the second arm by a slot, the second arm being positioned between the first arm and the optical axis;
wherein each of the dual arm clips are configured to elastically deform for attachment into an aperture defined by a bulkhead structure.

2. The fiber optic adapter of claim 1, wherein each one of the first double cantilever wings and the second double cantilever wings include ramped surfaces to facilitate insertion of the fiber optic adapter into the aperture defined by the bulkhead structure.

3. The fiber optic adapter of claim 2, wherein the ramped surfaces cause each one of the first double cantilever wings and the second double cantilever wings to flex inwardly as the fiber optic adapter is moved past the aperture of the bulkhead structure.

4. The fiber optic adapter of claim 1, wherein each one of the first double cantilever wings and the second double cantilever wings are integrally molded with respective first and second adapter halves of the housing.

5. The fiber optic adapter of claim 1, further comprising a first latch arm disposed on the first adapter half of the housing, and a second latch arm disposed on the second adapter half of the housing, the first and second latch arms projecting generally parallel to the optical axis.

6. The fiber optic adapter of claim 5, wherein the first latch arm of the first adapter half and the second latch arm of the second adapter half project in a direction toward each other such that the first latch arm is engageable with a second cavity defined in the second adapter half, and the second latch arm is engageable with a first cavity defined in the first adapter half.

7. The fiber optic adapter of claim 1, wherein the first and second ferrule alignment structures are configured to receive and coaxially align the ferrules of the first and second optical fiber connectors when the first and second optical fiber connectors are inserted into the fiber optic adapter.

8. The fiber optic adapter of claim 1, wherein the first and second ferrule alignment structures respectively include first and second sleeve mounts and first and second ferrule sleeves adapted to be respectively positioned within the first and second sleeve mounts.

9. The fiber optic adapter of claim 8, wherein the first sleeve mount of the first ferrule alignment structure includes a first axial bore and at least one latching hook that extends from a first end face of the first adapter half toward the first end of the housing, and wherein the second sleeve mount of the second ferrule alignment structure includes a second axial bore and at least one latching hook that extends from a second end face of the second adapter half toward the second end of the housing.

10. The fiber optic adapter of claim 9, wherein the at least one latching hook of the first ferrule alignment structure and the second ferrule alignment structure are configured to respectively flex laterally toward and away from the first and second axial bores for releasably latching the first and second optical fiber connectors to the fiber optic adapter.

11. The fiber optic adapter of claim 1, wherein the first and second ends of the housing are each sized to receive an SC-type optical fiber connector.

12. The fiber optic adapter of claim 1, wherein the housing, the first double cantilever wings, the second double cantilever wings, and the first and second ferrule alignment structures are injection-molded from a polymer.

13. The fiber optic adapter of claim 1, wherein the top side-wall of the housing defines a keying feature at each of the first and second ends of the housing configured to intermate with keying features of the first and second optical fiber connectors to orient the first and second optical fiber connectors in the correct orientation.

14. The fiber optic adapter of claim 8, wherein the first sleeve mount includes two latching hooks that extend from a first end face of the first adapter half toward the first end of the housing, and wherein the second sleeve mount includes two latching hooks that extend from a second end face of the second adapter half toward the second end of the housing, wherein the two latching hooks of the first sleeve mount extending toward the first end of the housing are positioned on opposite sides of a first axial bore and are configured to flex toward and away from each other to releasably latch the first optical fiber connector to the fiber optic adapter, and wherein the two latching hooks of the second sleeve mount extending toward the second end of the housing are positioned on opposite sides of a second axial bore and are configured to flex toward and away from each other to releasably latch the second optical fiber connector to the fiber optic adapter.

15. The fiber optic adapter of claim 14, wherein the two latching hooks of the first and second sleeve mounts each include inwardly extending portions configured to engage slots defined on housings of the first and second optical fiber connectors.

16. The fiber optic adapter of claim 1, further comprising a split sleeve that defines a longitudinal split that runs an entire length of the split sleeve.

17. The fiber optic adapter of claim 1, wherein the ferrule alignment structures are unitarily molded as a single piece with respective first and second adapter halves of the housing.

18. A fiber optic adapter for interconnecting first and second optical fiber connectors in coaxial alignment along an optical axis, each one of the first and second optical fiber connectors including a generally cylindrical ferrule holding an end of an optical fiber, the fiber optic adapter comprising:
a housing including an axial cavity defined by a top side-wall, a bottom side-wall, a right side-wall, and a left side-wall, the axial cavity of the housing having an axial length and a midpoint;
ferrule alignment structures located within the axial cavity of the housing; and
a first double cantilever wing positioned on the right side-wall of the housing and a second double cantilever wing positioned on the left side-wall of the housing, each one of the first double cantilever wing and the second double cantilever wing being slotted to provide a dual arm clip, each one of the dual arm clips comprising a first arm and a second arm, the first arm being stacked on top of the second arm, the second arm being positioned between the first arm and the optical axis, the dual arm clips being configured to elastically deform for attachment into an aperture defined by a bulkhead structure.

19. The fiber optic adapter of claim 18, wherein the fiber optic adapter is configured for interconnecting two SC type fiber connectors in coaxial alignment.

20. The fiber optic adapter of claim 18, further comprising a flange that outwardly protrudes on each of the right side-wall and the left side-wall of the housing.

21. The fiber optic adapter of claim 18, wherein the ferrule alignment structures are unitarily molded as a single piece with the housing.

22. An adapter assembly for interconnecting a pair of opposing optical fiber connectors generally along an optical axis, the adapter assembly being constructed as a two open-ended receptacle for receiving the optical fiber connectors in opposite open ends thereof, the adapter assembly comprising:
an adapter housing including a pair of adapter halves each defining one of the open ends for receiving one of the optical fiber connectors;
a ferrule alignment structure positioned in each one of the pair of adapter halves;
at least one latch member on one of the pair of adapter halves projecting parallel to the optical axis toward the other one of the pair of adapter halves, the at least one latch member being engageable with an opening defined in the other one of the pair of adapter halves; and
a first double cantilever wing positioned on a right side-wall of the adapter housing and a second double cantilever wing positioned on a left side-wall of the adapter housing, each one of the first double cantilever wing and the second double cantilever wing being slotted to provide dual arm clips, each one of the dual arm clips comprising a first arm and a second arm, the first arm being stacked on top of the second arm, the second arm being positioned between the first arm and the optical axis, the dual arm clips being configured to elastically deform for attachment into an aperture defined by a panel for mounting the adapter housing in the aperture of the panel.

23. The adapter assembly of claim 22, wherein the ferrule alignment structure is unitarily molded as a single piece in each one of the pair of adapter halves.

24. A fiber optic adapter for interconnecting first and second optical fiber connectors in coaxial alignment along an optical axis, each one of the first and second optical fiber connectors including a generally cylindrical ferrule holding an end of an optical fiber, the fiber optic adapter comprising:
a housing including a first end opposite a second end, the first end defining a first open receptacle for receiving the first optical fiber connector, the second end defining a second open receptacle for receiving the second optical fiber connector, the housing including first and second adapter halves each including an axial cavity defined by a top side-wall, a bottom side-wall, a right side-wall, and a left side-wall, the axial cavity of the first and second adapter halves each having an axial length;
a first ferrule alignment structure located within the axial cavity of the first adapter half of the housing, and a second ferrule alignment structure located within the axial cavity of the second adapter half of the housing;
a cantilever wing respectively positioned on the right and left side-walls of each one of the first and second adapter halves of the housing; and a first latch arm disposed on the first adapter half of the housing, and a second latch arm disposed on the second adapter half of the housing, the first and second latch arms projecting generally parallel to the optical axis;

wherein the first latch arm of the first adapter half and the second latch arm of the second adapter half project in a direction toward each other such that the first latch arm is engageable with a second cavity defined in the second adapter half, and the second latch arm is engageable with a first cavity defined in the first adapter half;

wherein the first and second ferrule alignment structures are configured to receive and coaxially align the ferrules of the first and second optical fiber connectors when the first and second optical fiber connectors are inserted into the fiber optic adapter;

wherein the first and second ferrule alignment structures respectively include first and second sleeve mounts and a ferrule sleeve adapted to be respectively positioned within the first and second sleeve mounts;

wherein the first sleeve mount of the first ferrule alignment structure includes a first axial bore and a first pair of latching hooks that extend from a first end face of the first adapter half toward the first end of the housing, and wherein the second sleeve mount of the second ferrule alignment structure includes a second axial bore and a second pair of latching hooks that extend from a second end face of the second adapter half toward the second end of the housing;

wherein the first and second pairs of latching hooks are configured to respectively flex laterally toward and away from the first and second axial bores for releasably latching the first and second optical fiber connectors to the fiber optic adapter;

wherein the first and second ends of the housing are each sized to receive an SC-type optical fiber connector; and wherein the ferrule alignment structures are unitarily molded as a single piece with respective first and second adapter halves of the housing, respective first and second latch arms, respective first and second pairs of latching hooks, and the cantilever wings.

* * * * *